United States Patent [19]

Ingerson

[11] 4,098,313

[45] Jul. 4, 1978

[54] TRACTION DEVICE FOR VEHICULAR WHEELS

[76] Inventor: Philip E. Ingerson, 4825 W. 96th St., Oak Lawn, Ill. 60453

[21] Appl. No.: 657,611

[22] Filed: Feb. 12, 1976

[51] Int. Cl.$^2$ .............................................. B60C 27/04
[52] U.S. Cl. ........................... 152/213 R; 152/225 R; 152/230
[58] Field of Search ...................... 301/41 R, 43, 44 R, 301/44 T, 5 B; 152/222, 225 C, 225 R, 226, 229, 230, 236, 233, 213 R

[56] References Cited

U.S. PATENT DOCUMENTS

| | | | |
|---|---|---|---|
| 1,438,148 | 12/1922 | Vescovi | 301/44 T |
| 2,470,607 | 5/1949 | Dritz | 152/233 X |
| 2,625,194 | 1/1953 | Westrate | 152/225 C |
| 2,694,432 | 11/1954 | Lengyel et al. | 152/225 C |
| 2,801,668 | 8/1957 | Mosca | 152/236 |
| 2,867,259 | 1/1959 | Barron | 152/225 C |
| 2,871,903 | 2/1959 | Minutilla | 152/225 C X |
| 2,898,968 | 8/1959 | Coven et al. | 152/236 |
| 2,987,092 | 6/1961 | Marcanello | 152/233 |
| 3,103,242 | 9/1963 | Culp | 152/225 C |
| 3,157,217 | 11/1964 | Ledbetter | 152/225 C |
| 3,165,137 | 1/1965 | Burgen | 152/236 |
| 3,277,943 | 10/1966 | Ziner | 152/236 |
| 3,303,729 | 2/1967 | Webb et al. | 152/233 X |
| 3,473,592 | 10/1969 | Marks | 152/225 R X |
| 3,695,325 | 10/1972 | Schuman | 152/225 R |

FOREIGN PATENT DOCUMENTS

| | | | |
|---|---|---|---|
| 1,453,374 | 8/1966 | France | 152/225 R |
| 1,181,725 | 1/1959 | France | 152/236 |

Primary Examiner—Robert B. Reeves
Assistant Examiner—Charles A. Marmor
Attorney, Agent, or Firm—McWilliams & Mann

[57] ABSTRACT

A traction device for a vehicular tire mounted on a wheel with a gripper tread with a plurality of small protrusions on the inner surface thereof make limited penetration into the tire tread to prevent radial or circumferential slippage of the traction devices about the tire. Larger protrusions on the outer surface of the gripper tread provide improved traction in mud, snow or sand. A pair of side arms, attached to ends of the gripper tread in a spaced apart, opposed relationship and at substantially right angles to the surfaces of said gripper tread, secure the traction device transversely about the tire by resilient engagement with the sidewalls of the tires, hooking cooperation with clips secured between the wheel rim and tire bead, or wedging connection between the brake drum flange and wheel.

4 Claims, 13 Drawing Figures

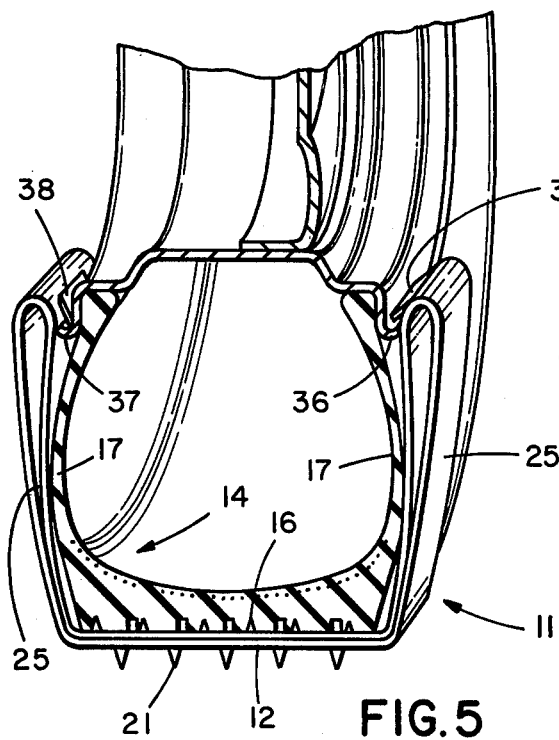
FIG. 5
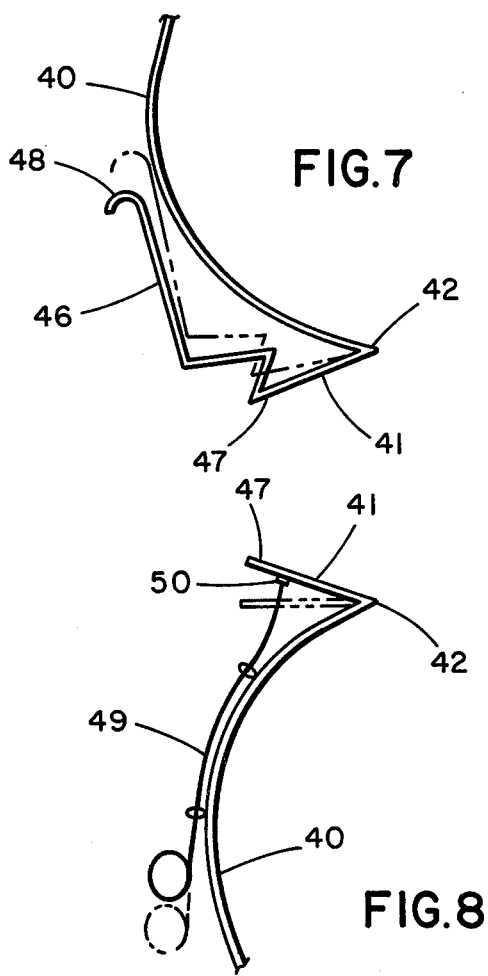
FIG. 7
FIG. 8
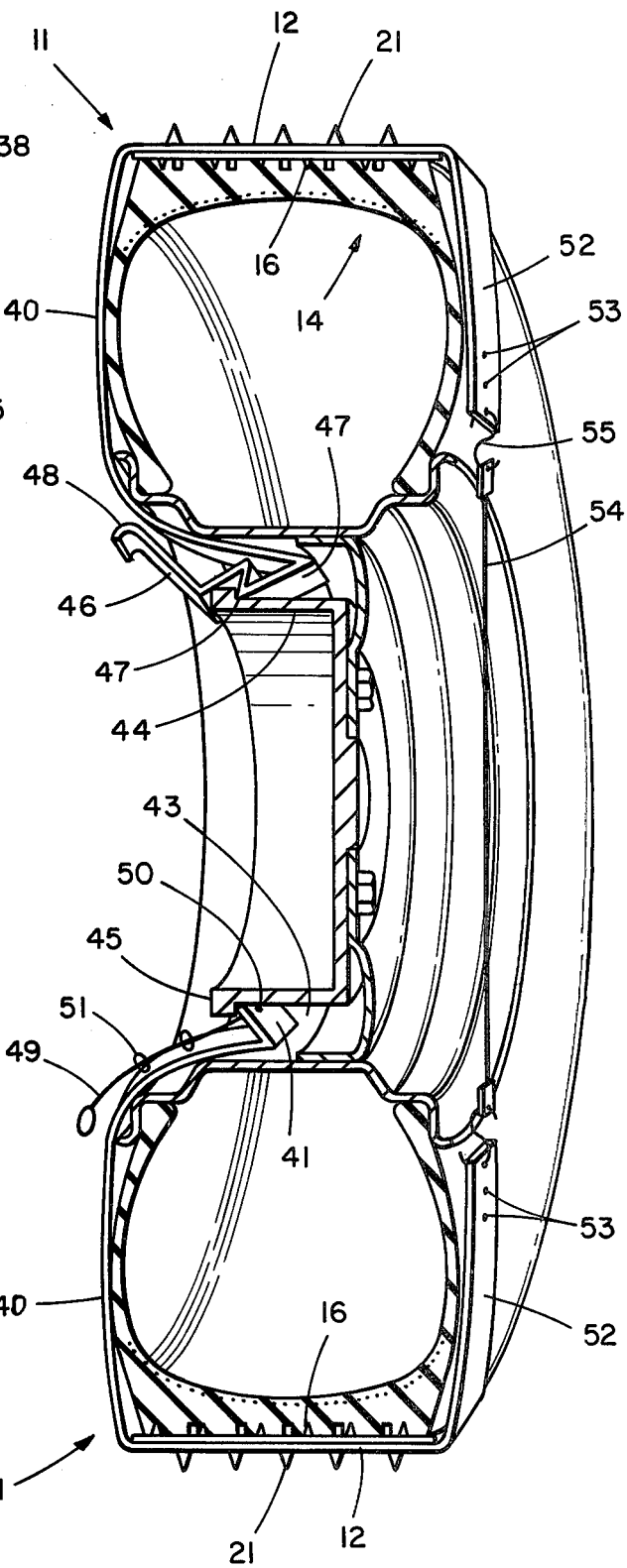
FIG. 6

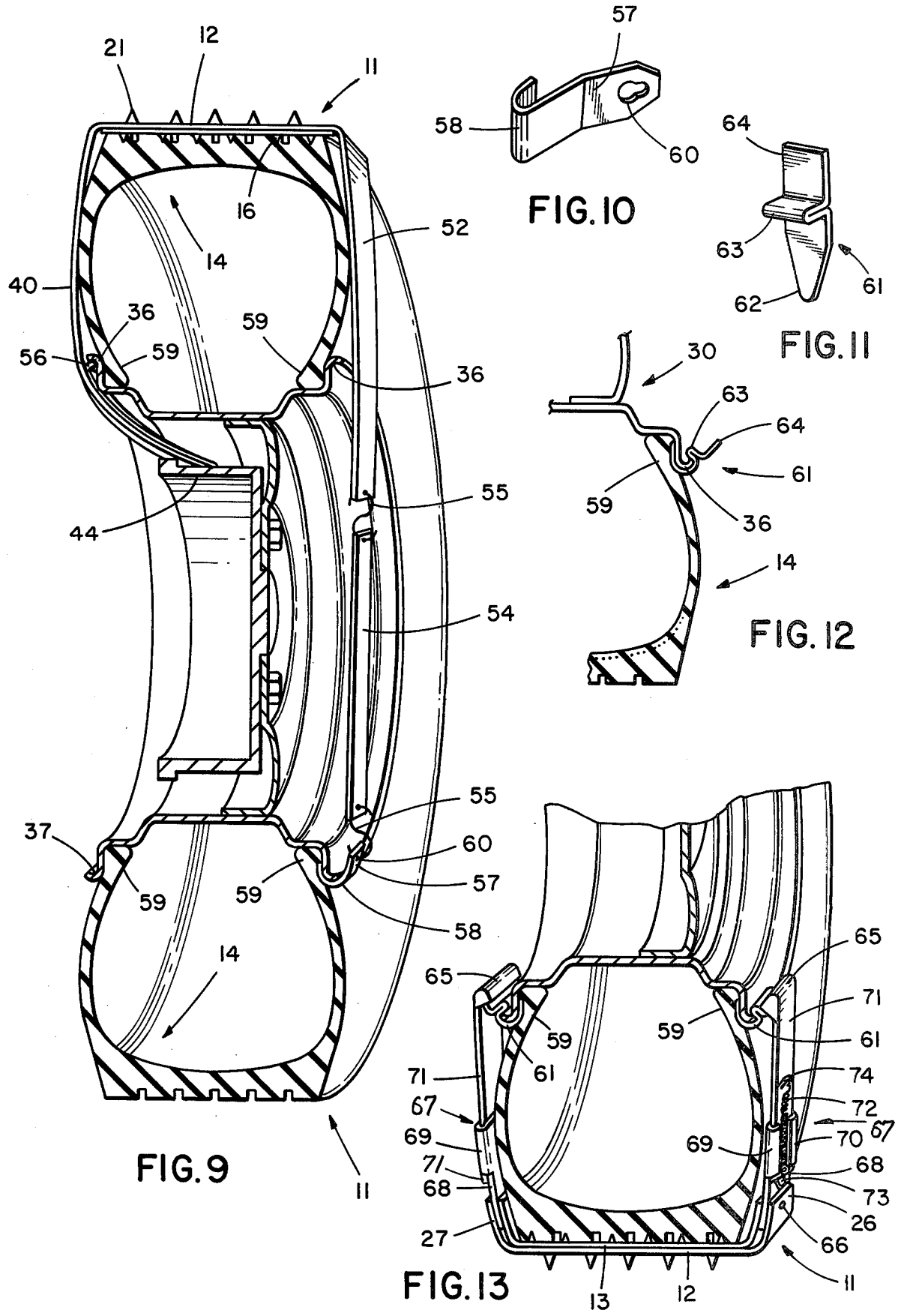

4,098,313

TRACTION DEVICE FOR VEHICULAR WHEELS

BACKGROUND OF THE INVENTION

This invention relates in general to a traction device for a vehicle wheel and various attachment means therefor, and more particularly to a traction device with small teeth or protrusions on the inner surface of the gripping tread for limited penetration into the tread of the tire, larger teeth or protrusions on the outer surface thereof to provide a gripping surface and various attachment means for securing the device about the tire.

Various types of traction devices and means for attaching the same about a tire and wheel are known in the prior art. Many such prior art devices are quite inconvenient or nearly impossible to attach to the vehicle wheel or tire when the vehicle has lost effective traction of one or more of its motive wheels by becoming mired in mud, snow, ice, sand or the like. Frequently the vehicle operator gets soiled while attaching the device. Some prior art devices require deflation of the tire or even breaking the bead of the tire from the wheel rim. Rain, snow or other dampness usually reduces the coefficient of friction between prior art traction devices and the tire, permitting the traction device to slip radially about the tire during use. Another frequently encountered limitation of prior art devices is the necessity of removing the hubcap, tire or wheel to attach the device.

SUMMARY OF THE INVENTION

The traction device of the present invention has a generally flat and elongated gripper tread with a plurality of small teeth or protrusions on the inner surface thereof for limited penetration into the tire tread. This prevents undesired radial or circumferential slippage of the traction device about the tire and consequent scarring or similar damage thereto. Larger protrusions on the outer surface of the gripper tread provide greatly improved traction in mud, snow, sand or the like.

A pair of side arms are attached to the ends of the gripper tread in a spaced apart, opposing relationship and are generally at right angles to said gripper tread surfaces. The side arms employ various attachment means to secure the traction device about the tire. The attachment means are designed to avoid the need for tools, disassembly of the tire or wheel, and the like, which are particularly difficult to perform when the tire and wheel become mired in mud, snow or similar conditions. In one form, the side arms resiliently engage the sidewalls of the tire. Another form utilizes inwardly and downwardly pointing tabs at the extreme ends of the arms to lock against the rims of the wheel. The extreme end of the arms may also be inserted in the annular space between the brake drum and wheel to wedge against the brake drum flange. Hooking attachment to various clips pressed between the wheel rim and tire bead may also be used in securing the traction device about the tire.

Various other features and advantages of the invention will become apparent from the following detailed disclosure when taken in conjunction with the drawings.

BRIEF DESCRIPTION OF THE DRAWINGS

In the drawings:

FIG. 5 is a cross-sectional view, in fragmentary perspective, of the traction device equipped with tabs to lock against the rims of the wheel;

FIG. 6 is a cross-sectional view of attachment means secured by a wedging action between the brake drum and the wheel and of attachment means for a pair of diametrically opposed traction devices;

FIG. 7 is a fragmentary side elevational view showing releasing means for the attachment means in FIG. 6;

FIG. 8 is a fragmentary side elevational view showing alternative releasing means for the attachment means in FIG. 6;

FIG. 9 is a cross-sectional view illustrating a wedging type of attachment means between the brake drum and wheel rim;

FIG. 10 is a perspective view of a clip for attaching the traction device to the rim of the wheel, as in FIG. 9;

FIG. 11 is a perspective view of an alternate clip attachment means;

FIG. 12 is a cross-sectional view of the clip of FIG. 11 as installed of the rim of the wheel; and FIG. 13 is a cross-sectional view, in fragmentary perspective, of the traction device with the gripper tread pivotally connected to the side arms.

DESCRIPTION OF THE PREFERRED EMBODIMENTS

Figure 1:
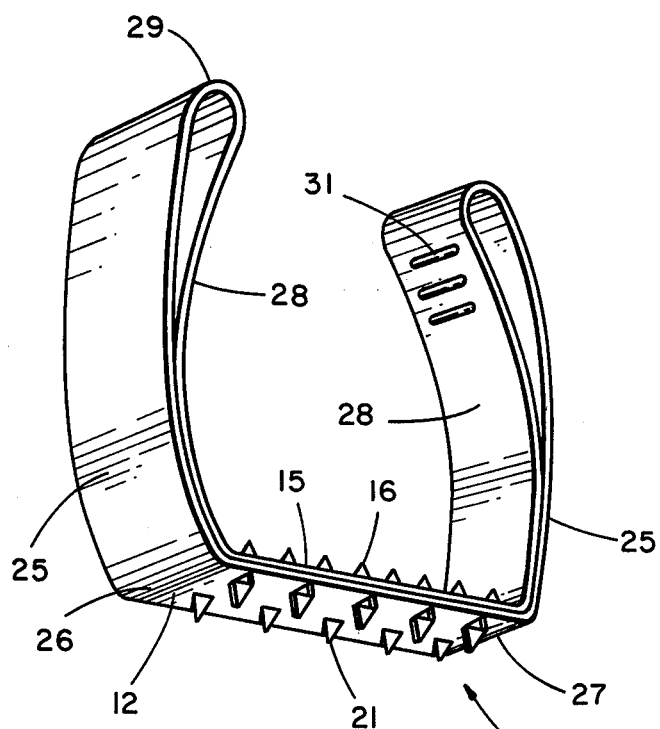
FIG. 1 is a perspective view of a traction device according to the present invention.

One embodiment of a traction device 11 is shown in FIG. 1. The device 11 has a relatively flat or planar gripping tread 12 which generally has a narrow width relative to the length thereof. The tread 12 is preferably longer than the width of a tread portion 13 of a tire 14 (FIG. 2) thereby allowing the tread portion 13 ample room to bear upon an inner surface 15 of the gripper tread 12.

According to the invention, the inner surface 15 of gripper tread 12 is provided with a plurality of small teeth or protrusions 16. The protrusions 16 are relatively sharp and effect limited penetration into the tread portion 13 of tire 14 thereby preventing circumferential or radial slippage of the device 11 about the tire 14 during use. Unlike sidewalls 17 of the tire 14, the tread portion 13 is relatively thick and limited penetration thereof causes no damage to the tire 14. Cords 19 provide reinforcement of the tire 14 and are usually located near an interior wall 20 of the tire 14. Thus, limited penetration of the protrusions 16 does not cause any structural damage to the tire 14. Furthermore, since the device 11 will remain in the same position on the tire 14, no significant scarring or other damage of the tread portion 13 occurs.

Figure 2:
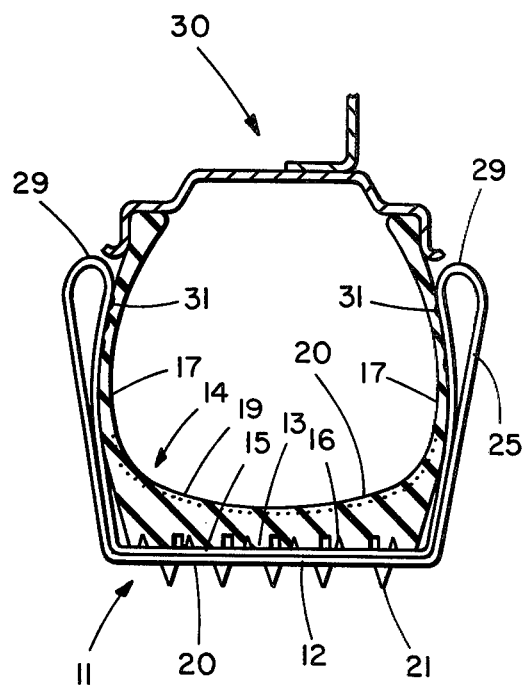
FIG. 2 is a cross-sectional view of the traction device in FIG. 1 resiliently attached to a tire with small protrusions of the device making limited penetration into the tread portion of the tire.

Projecting from an outer surface 20 of the gripping tread 12 are a plurality of considerably larger protrusions 21. Shown for the purposes of illustration in FIGS. 1 and 2 are protrusions 21 of triangular shape. It will be appreciated however that the protrusions 21 may assume many shapes and configurations suitable for providing traction in mud, snow, ice, loose gravel or the like. Since the gripper tread 12 will generally be fabricated from relatively thin metal, metal punching operations make triangular protrusions 21 preferable both from economic and structural considerations. Ragged and irregular edges formed by punching round holes in metal are an alternative for the triangular protrusions 21. Welding operations could also be employed to attach various forms of protrusions on the surface 20.

The plane of the protrusions 21 is preferably aligned with the length of the gripper tread 12 to provide optimum traction.

Figure 3:
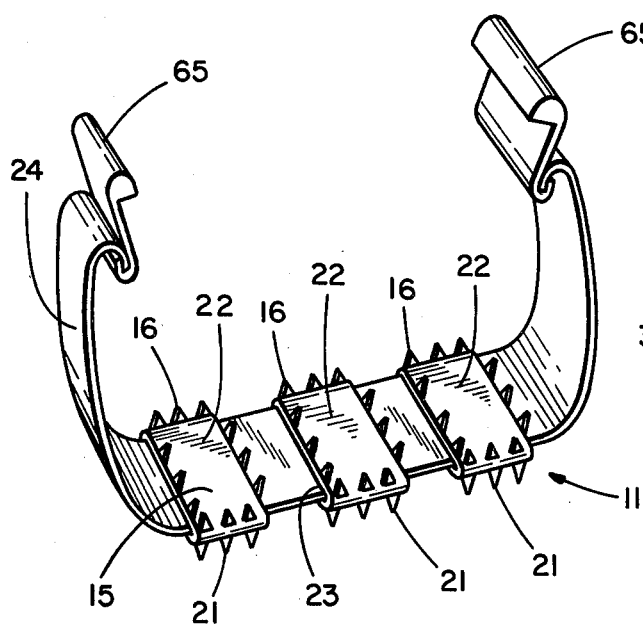
FIG. 3 is a perspective view of a traction device with multiple tread sections interconnected by a strap with enclosed hook attachment means.

As a variation of the gripper tread 12, a traction device employing multiple tread sections 22 is illustrated in FIG. 3. A slot 23 through each of the sections 22 in parallel planar relationship with the inner surface 15 thereof, accommodates a strap 24 to secure the tread sections 22 about the tire 14. Means of attaching the strap 24 about the base 14 is described hereinafter.

According to the invention various novel means of attaching the gripper tread 12 or sections 22 are employed.

Turning to FIGS. 1 and 2, the traction devices 11 utilize a pair of side arms 25 to resiliently engage the sidewalls 17 of the tire 14 to secure the device 11 thereon. The arms 25 are attached to opposite ends 26, 27 of the gripper tread 12 in a spaced apart, opposing relationship with said arms 25 being substantially at right angles to said gripper tread 12. An inner side 28 of each of the arms 25 has a continuously and gradually curved surface to conform to the curvature of the tire sidewalls 17. Preferably the arms 25 curve outwardly or away from the sidewalls 17 near the extreme ends 29 of the arms 25. The outward curvature of the ends 29 of said arms 25 aids in initial installation of the traction device 11 onto the tire 14.

In the preferred embodiment, the entire traction device 11 is fabricated from metal strap exhibiting resilient qualities such as spring steel. Such metal is sufficiently durable to provide effective protrusions 16 and 21 and, yet, is suitable for metal stamping and shaping operations. Another advantage is that the device 11 may be formed from a single length of metal strap. Where the arms 25 are formed from a continuous loop of strap as in FIGS. 1 and 2, the ends of the strap from which the gripper tread 11 are formed may be joined in the gripper tread 11 during the fabrication processes.

Most of the traction devices 11 of the present invention are intended for temporary or emergency use. The traction devices 11 are generally not designed to withstand continuous high speed use on hard surfaced roads. For those instances where more than temporary or emergency use is intended, an anti-friction surface such as the strips 31 (FIG. 1) on the inside 26 of the arms 27, may be desirable to minimize rubbing of the arms 25 against the tire sidewalls 17. The rubbing effect is due to the tire tread 13 flexing or flattening as it contacts the ground thereby supporting part of the vehicular weight. Nylon is a suitable material for the strips 31.

Figure 4:
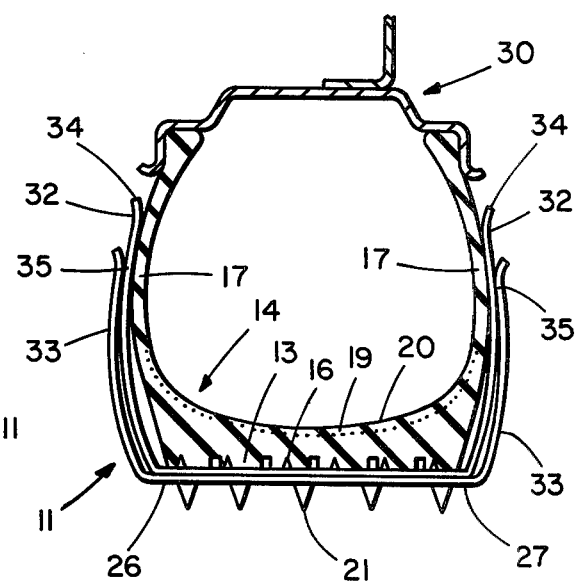
FIG. 4 is a cross-sectional view of the traction device in FIG. 2 with modified side arms.

An alternative form of the side arms 25 of FIG. 2 is illustrated in FIG. 4. Each side arm 25 consists of an inner strap 32 and an outer strap 33, each of said straps 32, 33 connected to the gripper tread 12 at the ends 26, 27 of the tread 12. The inner strap 32 is shaped much like the arms 25 of the device 11 in FIGS. 1 and 2 in that the inner strap 32 is shaped to conform to the tire sidewall 17 for most of the length thereof and is turned outwardly near the extreme end 34 thereof to aid in installing the traction device 11. The outer strap 33 is shorter in length than the inner strap 32 and is shaped to press against an intermediate point 35 of said inner strap 32, thereby exerting increased resilient pressure against the tire sidewall 17 to secure the traction device 11 about the tire 14.

Other than resilient attachment means for the traction device 11 may also be utilized. Illustrated in FIG. 5 is the traction device 11 with side arms 25 similar to those in FIGS. 1 and 2 but longer in length to extend past the rims 36, 37 of the tire 30. Rigidly attached to the curved ends 29 of the arms 30 are locking tabs 38, said tabs 38 being relatively short and pointing inwardly and downwardly toward the gripper tread 12. The tabs 38 are urged against the rims 36 of the wheel 30 by resilient forces exerted by the arms 25, thereby preventing the device 11 from being thrown off the tire 14 or wheel 30 by centrifugal or vibrational forces when the wheel 30 is rotating. In this embodiment, resilient contact of the arms 25 with the tire sidewalls 17, if any, is minimal and not of significant consequence.

Yet another novel attaching means for the gripper tread 12 is shown in FIG. 6. An inner arm 40 fabricated from metal strap has a short portion 41 bent back toward the arm 40 at an oblique angle of more than 90° but less than 180°, thereby forming a wedge shaped end 42. A brake drum 44 rigidly mounted to the wheel 30 defines an annular space 43 therebetween. The brake drum 44 usually has an enlarged rim or flange 45 near the open side of the drum 44. The wedge-shaped end 42 of the arm 40 can be inserted into the annular space 43 with the portion 41 lodged between the wheel 30 and the flange 45 of the brake drum. As can readily be appreciated, any tension in the arm 40, because of centrifugal forces due to rotation of the tire 14 and wheel 30, causes the portion 41 at the end 42 to exert more force between the wheel 30 and the flange 45.

Release means for the wedge shaped end 42 may comprise a lever 46 attached to the portion 41 near an end 47 thereof which engages the flange 45 of said drum 44. The lever 46 preferably has a handle portion 48 for manually moving said lever 46 to release the arm 40 from attachment. FIG. 7 illustrates the releasing action of the lever 46 in dotted lines.

Alternative release means in FIG. 8 uses a release cable 49 attached to the portion 41 at a point 50 near the end 47 of the portion 41. Wire is a suitable material for the cable 49. Guide means or loops 51 along the arm 40 bring the cable 40 to an accessible location for manual operation thereof.

Furthermore, the traction device 11 may be released without the necessity of separate release means when an outer arm 52 is unattached if the annular space 43 is of sufficient width to permit twisting of the arm 40 such that the portion 41 is turned away from the flange 45, thereby avoiding the wedging engagement therewith. Another advantage of the wedge shaped end 42 is that the end 42 will slide in the annular space 43 during insertion if the end 42 is not originally inserted at the desired position.

FIG. 6 also illustrates that diametrically opposed traction devices 11 may be attached to each other via the outer arms 52 thereof. A plurality of apertures 53 in the outer arm 52 are utilized with a tension strap 54 and S-shaped connectors 55 connecting the strap 54 to the apertures 53 such that the traction devices 11 are mounted along a diameter of the wheel 30. The tension strap 54 may comprise an elastic material, coil spring or other tensionally resilient material. The tension to secure the diametrically opposed traction devices 11 about the tire 14 may be adjusted as desired by appropriate selection of the apertures 53.

Another form of wedging action attachment means is illustrated in FIG. 9. The inner arm 40 is bent back upon itself in nearly a 180° reverse bend and terminating in a tab 56 at a right angle to the reversely bent portion of the arm 40. The tab 56 lodges against the rim 36 of the wheel 30. A wedging action is thereby achieved between the drum 44 and the rim 36. This type of attachment means is particularly useful where the drum 44 does not have an abrupt flange 45 for cooperation with the attachment means of FIG. 6.

Further attachment means for the traction device 11 include clips, and the like, frictionally fastened between the rims 36, 37 of the wheel 30 and a bead 54 of the tire 14 adjacent to the rims 36, 37. Referring to FIGS. 9 and 10, a clip 57 of generally flat strip metal has an aperture 60 near one end thereof for attachment to the gripper tread 12, or intermediate connecting elements such as the S-shaped connectors 55. The clip 57 has another end 58 gradually bending to form a U-shaped hook. The hooked end 58 may be attached to the rim 37, as by pressing the clip 57 with finger pressure. The clip 57 will be frictionally secured by pressure between the rim 37 and the bead 59 preventing radial displacement about the rim 37, and the rim 37 will provide support for the tensional forces exerted on the clip 57 in attaching the traction device 11 about the tire 14.

The previously presented attachment means are designed for convenient attachment of the traction device 11 about the tire 14 in emergency or in other situations where the need for such a device 11 is generally unanticipated. Hence, these attachment means require no special tools and no disassembly of the wheel, tire, or associated parts for attaching the traction device to the tire 14 and the wheel 30.

Other forms of attaching means can be used where the vehicle operator wishes to be prepared in advance for such emergencies. Shown in FIG. 11 is a clip 61 with a tapered, spade-like pointed end 62. An intermediate stop 63 is provided between the end 62 and an opposite end 64 and is formed by bending a metal strip at a 90° angle, then reverse bending a the strip at a 180° angle, then again reverse bending the strip at a 90° angle such that the clip 61, except for the intermediate stop 63, is essentially planar and the stop 63 juts outwardly at a right angle therefrom. The clip 61 may be driven between the rims 36, 37 and the tire bead 59 by a hammer, or the like, without disturbing the pneumatic seal between the rims 36, 37 and the bead 59. When the intermediate stop 63 comes to rest against the rims 36, 37 the clip has been driven a sufficient distance for adequate frictional securement. The end 64 may then be bent away from the tire 14 with the intermediate stop 63 wrapping about the rim 36 and the end 64 pointing away from the rim 36. The clip 61 has assumed a W-shape. Such a clip 61 may be utilized with the enclosed hooked ends 65 of the traction device 11 shown in FIG. 3. Clip 61 could also be used with rings or slots at the ends of the side arms.

Of course, enclosed hooked ends 65 could alternatively be used as attachment means for the resilient arms 25 of the traction devices 11 in FIGS. 1 and 2 and for the wedging ends of the arms 40 in FIGS. 6 and 9, as illustrated in FIG. 13. The traction device 11 of FIG. 13 is further characterized by a pivoted connection of the gripper tread 12 to the side arms 67. In this embodiment, the ends 26, 27 of the gripper tread 12 are bent upwardly at about 90° and provided with apertures 66 therein. The ends 26, 27 are pivotally connected to the side arms 24 at the apertures 66, as by a rivot, pin or similar fastening means. The pivoted connection of the gripper tread 12 to the side arms 67 better enables the gripper tread to conform to the tire tread 13 as the tire 14 flexes upon contacting the ground.

To further accommodate flexing of the tire tread 13, the side arms 67 in FIG. 13 have a telescoping action. A lower telescoping arm portion 67 is pivotally connected to the gripper tread 12 at the aperture 66. Longitudinal edges 69, 70 near the other end of the lower arm 67 are rolled over through 180° to define a slot at said end. An upper telescoping arm 71 slides in said slot defined by the rolled longitudinal edges 69, 70. Resilient means, such as a coil spring 72, elastic strap or the like, is connected to a hook 73 on the lower arm 68 at one end and to a similar hook 74 on the upper arm 71 at the other end. The resilient means tends to pull the upper arm 71 into the lower arm 68 thereby minimizing the length of the side arm 67, keeping the gripper tread 12 against the tire tread 13 and keeping the attachment means engaged.

As can be seen from the various drawings, the traction devices 11 may be used singularly or in plurality, as desired. Additionally, in vehicles equipped with limited slip differentials wherein the rotation of one drive or motive wheel is limited with respect to the rotation of the other wheel, sufficient traction may result from using the traction device 11 on only one of the wheels.

It will be understood that various changes and modifications may be made without departing from the spirit of the invention as defined in the following claims, and equivalents thereof.

I claim:

1. A traction device for a vehicular wheel and a tire mounted on the wheel, the tire having a tread portion and a pair of opposed spaced apart sidewalls between said tread portion and said wheel wherein the vehicular wheel is rigidly attached with respect to a brake drum thereby defining an annular space between the wheel and the brake drum, the brake drum having a flange associated therewith in said annular space, said traction device comprising;

a relatively flat, elongated gripper tread defining an inner surface, an outer surface, and a first and a second ends thereto;

a pair of arms attached to the ends of said gripper tread in a spaced apart, opposing relationship, said side arms being substantially at right angles to said gripper tread wherein at least one of said side arms comprises a metal strap having an extreme end;

attachment means cooperating with said side arms about said tire, said attachment means not penetrating into said sidewalls wherein said attachment means for one of said side arms comprises a portion of said extreme end bent back upon itself at an oblique angle of greater than 90° but less than 180° thereby defining a wedge-shaped end of said strap, said wedge-shaped end being flexible and adapted for insertion into an annular space between a brake drum and said wheel, an edge of said portion adapted to engage a flange on said brake drum to secure said wedge-shaped end in said annular space;

a plurality of relatively short protrusions projecting from the inner surface of said gripper tread for limited penetration into the tread of said tire to prevent radial or circumferential slip of the traction device about said wheel; and a plurality of larger protrusions projecting from the outer surface of said gripper tread to provide improved traction in mud, ice, snow, sand and the like.

2. The traction device of claim 1 further including release means for said attachment means.

3. The traction device of claim 2 wherein said release means comprises a lever attached to said portion of said wedge-shaped end near said edge thereof.

4. The traction device of claim 2 wherein said release means comprises a cable attached to said portion of said wedge-shaped end near said edge thereof.

* * * * *